United States Patent [19]

Levedahl

[11] Patent Number: 5,684,690
[45] Date of Patent: Nov. 4, 1997

[54] INTEGRATED ELECTRICAL POWER SUPPLY SYSTEM FOR PROPULSION AND SERVICE CONTROL

[75] Inventor: William J. Levedahl, Annapolis, Md.

[73] Assignee: The United States of America as represented by the Secretary of the Navy, Washington, D.C.

[21] Appl. No.: 700,750

[22] Filed: Aug. 16, 1996

[51] Int. Cl.$^6$ .................................................. B60L 11/02
[52] U.S. Cl. ........................... 363/178; 290/4 R; 307/84; 440/6
[58] Field of Search ........................... 363/178; 307/84; 114/269, 270; 290/4 R; 440/6

[56] References Cited

U.S. PATENT DOCUMENTS

| | | | |
|---|---|---|---|
| 3,585,473 | 6/1971 | Huxtable et al. | 318/140 |
| 4,661,714 | 4/1987 | Satterthwaite et al. | 290/4 R |
| 4,709,203 | 11/1987 | Roux et al. | 307/84 |
| 4,927,329 | 5/1990 | Kliman et al. | 416/127 |
| 5,194,757 | 3/1993 | Wertheim | 307/84 |
| 5,199,912 | 4/1993 | Dade et al. | 440/6 |
| 5,215,156 | 6/1993 | Stulbach et al. | 180/65.3 |

*Primary Examiner*—Stuart N. Hecker
*Attorney, Agent, or Firm*—John Forrest; Jacob Shuster

[57] ABSTRACT

Engine driven turbines respectively drive separate propulsion and service alternators to supply power to propulsion motors and service equipment on naval combat ships through propulsion and service controls. Rechargeable batteries are connected through the service controls to the service alternators and to service loads through dc bus lines. The propulsion controls interconnect the propulsion motors with the propulsion alternators to which the electrically operated weapons are also connected through rectifiers and a pulse forming network.

10 Claims, 4 Drawing Sheets

INTEGRATED ELECTRICAL POWER SUPPLY SYSTEM FOR PROPULSION AND SERVICE CONTROL

The present invention relates in general to a system for controlling the directional flow of electrical energy to plural loads under different conditions, and in particular to the supply of electrical power on board naval sea-going vessels for propulsion and service equipment operational purposes.

BACKGROUND OF THE INVENTION

Currently the cost of supplying electrical current to equipment aboard a U.S. Naval combat ship is a major portion of its total construction and operational cost because of a relatively low overall thermo/hydro-dynamic efficiency associated therewith. Such equipment includes geared, mechanical-drive gas turbines and propellers with hydraulically controlled pitch for ship propulsion. In such arrangement of equipment, two gas turbines customarily drive each of two shafts while two of three ship-service turbines provide constant-frequency ship-service power. Under normal cruise conditions, the power from one propulsion turbine is sufficient for all purposes, with an integrated electric drive system accommodating use of one turbine to perform all functions during cruise.

Presently, the use of an integrated electrical drive system is being considered, wherein electrical power generated by gas turbine driven alternators is rectified, transmitted through a direct current bus, combined and conditioned through solid-state controls for supply to each propulsion motor at its chosen frequency and voltage. The remainder of such alternator generated power is supplied to auxiliary equipment including electrically operated combat weapons, each at its chosen frequency and voltage. Such an integrated electrical power supply system is proposed so as to provide several advantages based on the availability of commercial technology presently utilized on cruise ships having service equipment loads larger than their ship propulsion loads. However, such an integrated electrical power supply system has certain disadvantages with respect to size, weight, cost and solid-state control inefficiency accentuated on naval combat ships wherein a larger proportion of the power is utilized for ship propulsion purposes and operational efficiency is of utmost importance. Further, use of presently available high-power, solid-state devices with low switching frequencies creates harmonics which may cause excessive heating and vibrational excitation of the electric motors, such that acoustical quieting of ship operation and motor cooling become more difficult while fuel consumption rises.

SUMMARY OF THE INVENTION

In accordance with the present invention, an arrangement is provided wherein each engine driven turbine drives both a propulsion alternator and a separate ship service alternator. Under voltage control of field excitation, the propulsion alternator produces sinusoidal polyphase current within two stator windings upon absorption of full turbine power. While one stator winding supplies alternator generated power to the propulsion motors, the other stator winding occasionally powers electrically operated weapons. Each propulsion motor is of an induction type either directly connected to the alternators or connected through toroidal-field rotating transformers to drive either contrarotating propulsion propellers or a single propeller. The electrical power is supplied to such induction type motors through propulsion controls including multipole, multi-throw switches, resistance varying actuators and alternator field modulators. One or more stator windings of each propulsion motor is thereby selectively connected to one or more alternator stator windings, while adjacent motor poles may be selectively connected across energy-absorbing shunt resistors.

The separate service alternators are also voltage controlled by field excitation to provide full ship service at a specified fraction of turbine speed through service controls having solid-state rectifiers from which direct current bus lines extend to dc power batteries which may be recharged therethrough by the service alternators. Alternatively, the batteries power the service alternators as motors to start operation of the turbines as well as vital loads during a fault condition until a reserve turbine alternator is brought on line. Certain service loads are supplied with AC power through individual pulse-width modulators.

As a result of the foregoing referred to arrangement of the integrated electrical power supply system of the present invention, the magnitude and cost of solid-state circuitry is reduced, heating and vibration of the propulsion motors is minimized by input thereto of sinusoidal current and the number of turbines and alternators placed on line at any given time is minimized to both minimize wear and maximize efficiency. Also, propulsion operation is enhanced by more rapid completion of a crash reversal procedure. A further advantage resides in switch closings and openings caused to occur when near zero voltage and current exists at the switch contacts to avoid use of more complicated switches which open under high current conditions. Other advantages include battery back-up of vital loads, and use of simple induction type of motor and field-controlled alternator arrangement.

The present invention accommodates operation under each condition with the minimum number of engines, to provide minimum fuel consumption without requiring wave-shaping solid-state controls, except for smaller loads such as motors in the ship-service system. Power to the induction type of propeller driving motors is controlled by fuel flow to the turbine, by the near-zero current switch openings to select electric transmission paths, and by varying the excitation of alternator fields. In some cases, each motor will have two armature windings with differing numbers of poles. Quick stopping (crashback) is achieved by slowing the propeller and initial use of braking resistors. When motor and turbine speeds approach zero, electric leads are quickly reversed and the turbine accelerates the propeller rearwardly. Ship service power is transmitted by reversible controlled rectifiers to direct current buses which have battery energy storage to provide temporary power for the vital loads.

DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENTS

Figure 1:
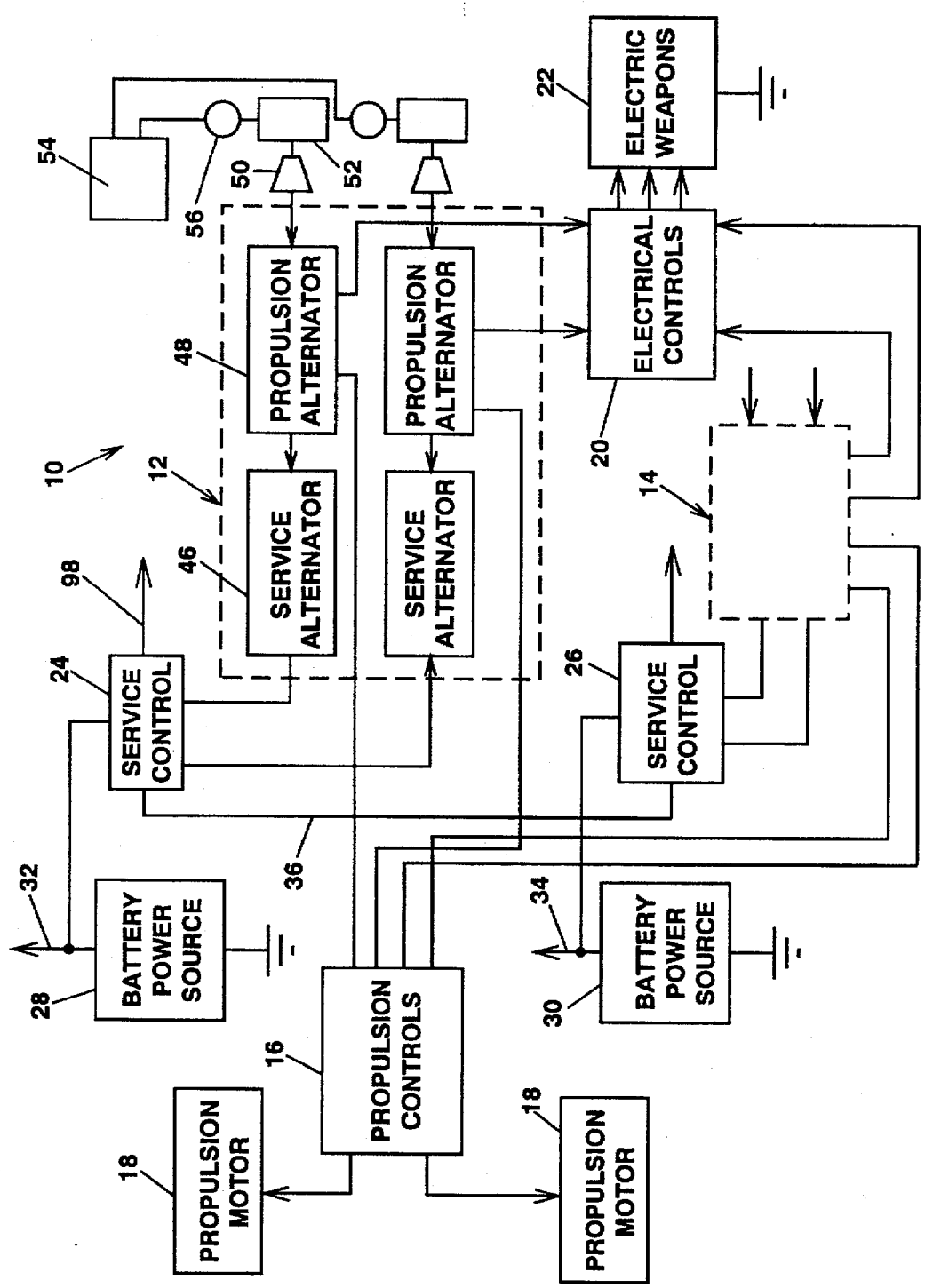
FIG. 1 is a block diagram schematically representing the system of the present invention in accordance with one embodiment thereof.

Referring now to the drawing in detail, FIG. 1 diagrammatically outlines an integrated system 10 supplying electrical power for propulsion and servicing of a sea-going naval vessel or the like. By way of example, FIG. 1 diagrams two separate alternator sections 12 and 14 of the system having similar arrangements both connected through propulsion controls 16 to propulsion motors 18 and electrical controls 20 for electrically operated equipment such as naval weapons 22. Each of the alternator sections has a separate service control 24 or 26 associated therewith to which battery sources of power 28 and 30 are respectively connected through power bus lines 32 and 34. Bus line 32 is also directly connected to service control 24 which is interconnected with the other service control 26 by line 36.

With continued reference to FIG. 1, each of the alternator section 12 and 14 includes a pair of service alternators 46 and propulsion alternators 48. Both service alternators 46 of section 12 are electrically connected to the service control 24 while the service alternators of section 14 are likewise electrically connected to service control 26. All of the propulsion alternators 48 are electrically connected to the propulsion motors 18 through propulsion controls 16. Turbines 50 respectively driven by engines 52 drive both the alternators 46 and 48. Fuel from a source 54 is controllably fed through fuel supply controls 56 to the engines 52. Phase voltages of the electrical energy generated by the alternators 46 and 48 are controlled by field excitation controls.

Figure 3:
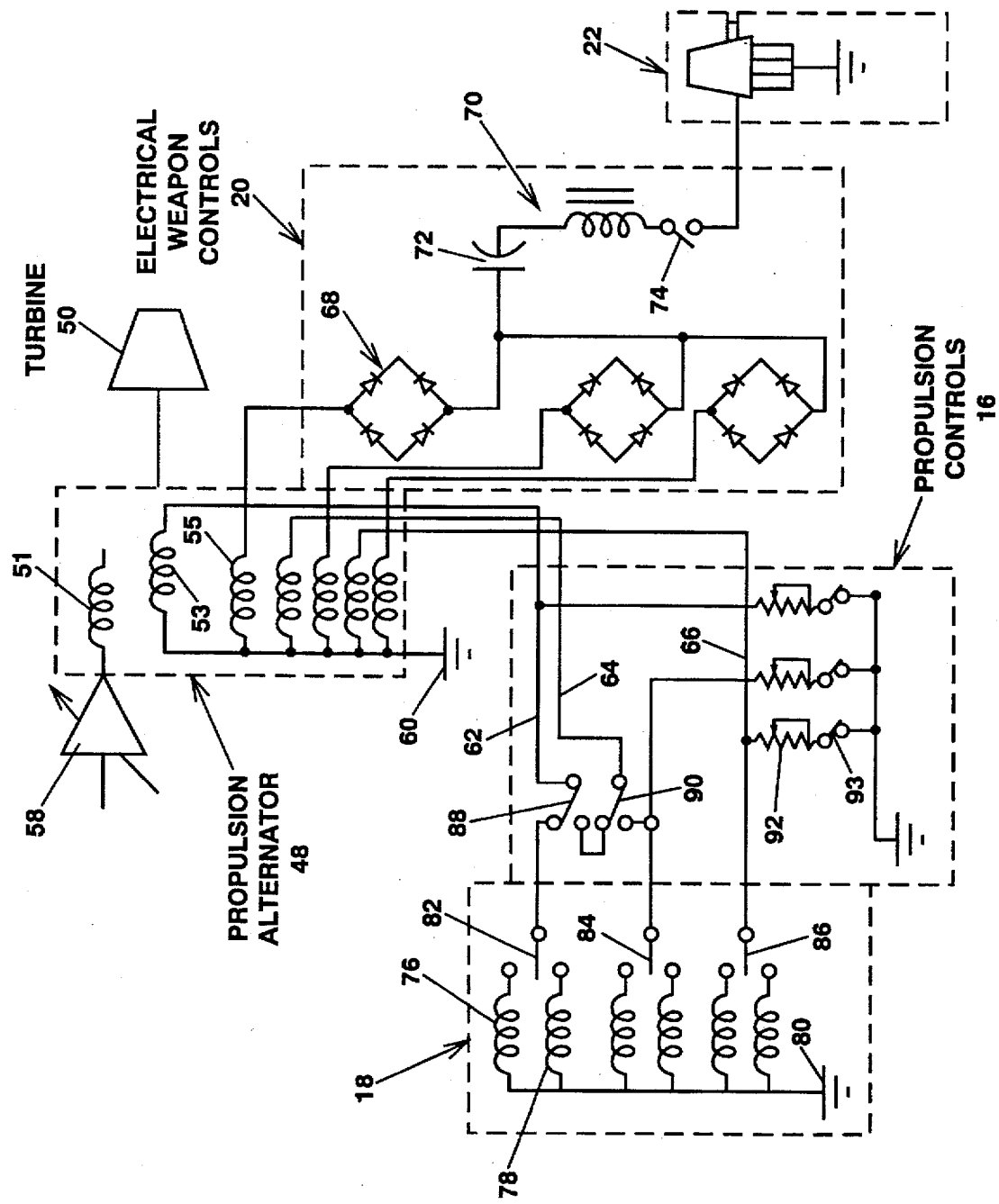
FIG. 3 is a circuit diagram corresponding to more detailed illustrations of certain components of the system depicted in FIG. 1.

As diagrammed in FIG. 3, each propulsion alternator 48 is of a generally known polyphase type having three pairs of sinusoidal stator windings 53 and 55. Such alternator 48 absorbs full turbine power to produce sinusoidal polyphase current in the stator windings 53 and 55 at a voltage influenced by field excitation winding 57 connected to field control 58. The windings 53 are connected between ground 60 and bus lines 62, 64 and 66 to the propulsion controls 16 while the windings 55 are respectively connected to rectifiers 68 of the electrical controls 20 having a pulse forming network 70 coupled to the rectifiers 68 through capacitor 72. The pulse forming network 70 is selectively connected to one of the weapons 22 through switch 74.

Each propulsion motor 18 is of a generally known polyphase induction type having a low-resistance, low-slip squirrel cage rotor typically made of a solid silicon-steel casting with constant-width teeth and a solid copper cage. Such rotor for the motor 18 has a slightly larger diameter and smaller air gap than that of the rotor of the propulsion alternator 48 of similar construction. Each induction motor 18 also has two stator windings with differing numbers of poles but the same number of phases. By way of example, FIG. 3 diagrams the induction motor 18 as having a three-phase multiple winding arrangement in which three pairs of stator windings 76 and 78 are connected between a common ground 80 and double-throw contactor switches 82, 84 and 86 through which the windings are selectively connected to the propulsion controls 16.

With continued reference to FIG. 3, the propulsion controls 16 include a pair of double-throw reversing contactor switches 88 and 90 respectively connected to bus lines 62 and 64 from the propulsion alternator 48. In the contact position of the switches 88 and 90 shown, the bus line 62 is connected to the winding contactor switch 82 of the propulsion motor 18. In the other position of the switches 88 and 90, the bus line 64 is connected to winding contactor switch 84. Winding contactor switch 86 on the other hand is directly connected to the bus line 66. All three main power bus lines 62, 64 and 66 are respectively connected to shunt breaking variable resistors 92 selectively connected to ground through switches 93. The propulsion control 16 thereby selectively connects one of motor stator windings 76 and 78 to one or more alternator stator windings 53, while selectively connecting energy absorbing resistors 92 across adjacent motor poles.

Figure 4:
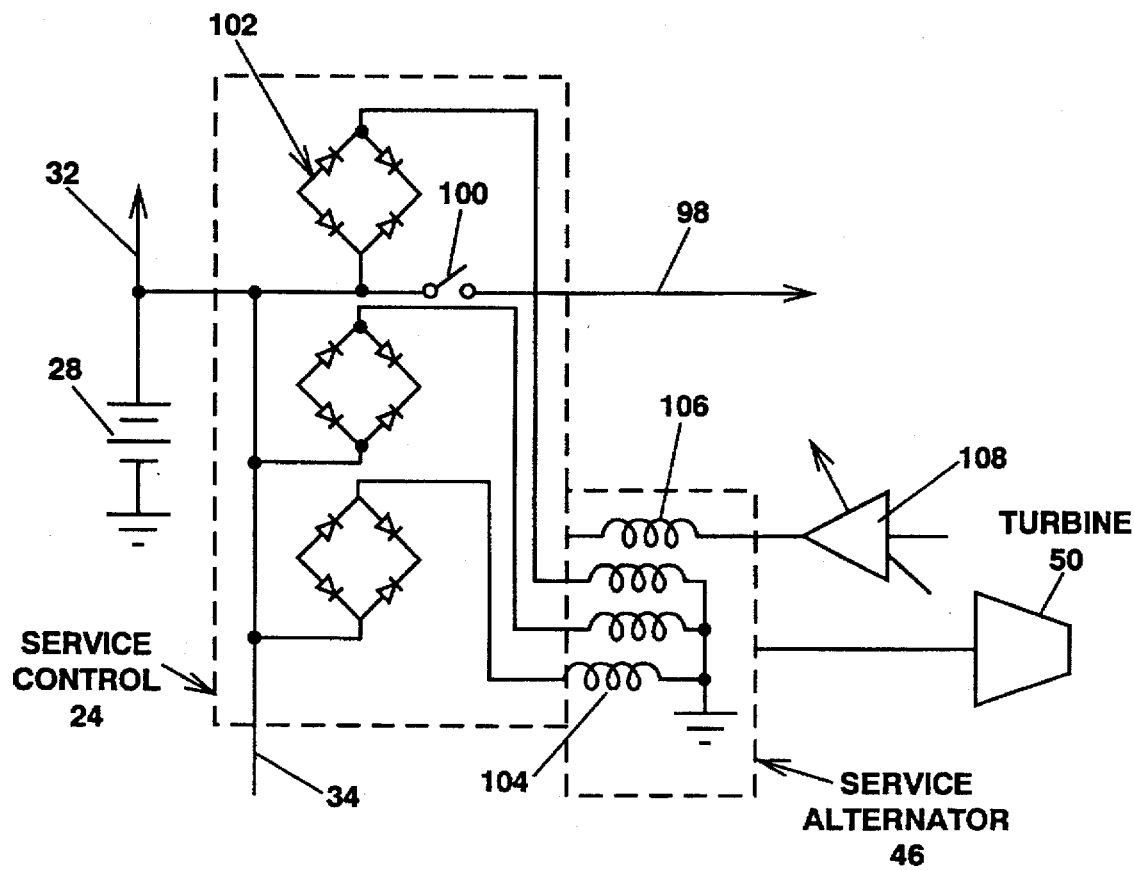
FIG. 4 is a circuit diagram as a more detailed illustration of yet other components of the system depicted in FIG. 1.

Propulsion of the ship or vessel by the two or more induction type of propulsion motors 18 is selectively controlled under varying conditions through the system 10 hereinbefore described in conjunction with the supply of fuel through controls 56 to the engines 52 from source 54 as diagrammed in FIG. 1. Power for servicing of ship equipment is supplied through power bus lines 98 from the service controls 24 and 26 as also diagrammed in FIG. 1. Direct current servicing power is supplied to bus line 98 from the main power bus 32 by closing of switch 100 in the service control 24 diagrammed in greater detail in FIG. 4.

The direct current bus lines 32, 34 and 98 to which the battery sources 28 and 30 are connected are also connected through three rectifiers 102 to the grounded windings 104 of a turbine driven service alternator 46 by means of which the battery may be recharged and/or electrical power supplied to the DC servicing bus lines. The alternator 46 also has a field excitation winding 106 connected to a field control 108. The dc current thereby supplied to the servicing bus lines may power many conventional types of equipment loads on the ship such as lighting systems and cooking appliances. Alternatively, the batteries when charged may power the alternator 46 as a synchronous motor.

Utilizing the system 10 hereinbefore described, operation of a sea-going vessel may be initiated from a cold-start condition by supply of electrical power from one of the battery sources 28 and 30 to start one of the engines 52 by supply of power through service control 24 or 26 to a service alternator 46 causing rotation of its rotor connected to a turbine 50 producing airflow in its gas generator. When the engine reaches sufficient speed, fuel is then introduced through a fuel supply control 56 to form a fuel-air mixture that is electrically ignited through bus line 98 by closing of switch 100 for self-sustaining rotation of a turbine 50. The battery source is then disconnected by opening of switch 100 and fuel is added through control 56 to the engine 52 until a desired start-up speed is attained. The service alternator 46 being rotated by a turbine 50 will then generate electrical energy to recharge the battery 28 or 30 and/or otherwise provide service power through bus line 32 or 98. The other engine 52 may be subsequently started using the same procedure except for initial supply of electrical energy thereto from the first started engine rather than a battery source 28 or 30. The excitation control 58 provides no excitation to the propulsion motors under the foregoing cold-start initiation procedure to minimize start-up load on the battery.

All of the switches 82, 84 and 86 to the propulsion motors 18 associated with a started engine 52 are closed to connect the low-speed windings 78 to a propulsion alternator 48 under zero voltage condition. The rotor field winding 57 of the propulsion alternator is then gradually excited by control 58, gradually increasing torque on the propulsion motors which start to rotate with 100% slip, increasing gradually to a motor speed close to 1% slip. Fuel flow to the engine is maintained at a minimum in such operational mode to provide sufficient alternator speed for service power needs corresponding to low-speed harbor maneuvering or loiter after reaching some operational locale. Acceleration to a higher speed is accomplished by adding fuel until maximum permissible speed is attained. Operation at yet higher ship speeds requires switching to the lower number of motor poles associated with windings 76 and reducing fuel flow and excitation to zero of the propulsion alternator. Also, switches 82, 84 and 86 are switched to the minimum number of poles, while excitation of the field is gradually restored to make the motor nearly synchronous with the alternator. Fuel is then added to obtain acceleration to the desired higher speed.

Acceleration of the vessel from some maximum speed with one engine requires the starting of an additional engine 52 and rotation of its associated propulsion alternators 48, bringing it up to the speed of the previously started engine by increasing fuel supply thereto while interconnecting the phase windings of the associated propulsion motor and propulsion alternator so as to equalize phase voltage of both operating alternators. After such winding interconnection is complete, fuel is added until the desired speed is attained.

By decreasing fuel flow to an operating engine 52, propulsion may be decelerated from a constant speed. Further deceleration to a low forward speed may be effected by reducing the number of operating engines to one. Still further reduction in speed may be effected by switching from a motor winding 76 with lesser poles to a motor winding 78 with more poles. All of such speed reductions also reduce fuel consumption. A final reduction in speed, after engine speed has been reduced to the minimum permissible value, is achieved by reducing excitation of the rotor winding in the propulsion alternator to permit pole slip of the motor to increase. The latter reduction in speed essentially involves reducing motor efficiency by increasing rotor losses.

A directional reversal in propulsion from the low forward speed may be initiated by reduction in fuel flow to its minimum tolerable level and reduction in excitation of the operating propulsion alternator 48 toward zero, at which point a reversal in wiring connections is effected by actuation of the switches 88–90 in the propulsion controls 16. The excitation current in the alternator 48 may then be increased gradually until the reversed motor speed approaches synchronism with the alternator. Fuel flow to engine 52 may then be increased to obtain the desired reversed motor propulsion speed.

A reversal or crash astern maneuver from a high forward speed is initiated by reducing fuel flow to a minimum and electrically connecting the shunt resistors 92 between adjacent motor phases under control of the grounding switches 93 in the propulsion controls 16 to produce negative speed reducing torque on the motor driven propellers. The shunt resistors 92 may be reduced in resistance values toward zero during the reversal maneuver as rapidly as necessary to maintain maximum tolerable negative torque. When resistance is reduced to near zero, the propeller and engine speeds are also near zero. At that point the following sequence of events occurs very rapidly within a fraction of a second to complete the reversal maneuver. Alternator field excitation is reduced to zero; the switchgear 88–90 is reversed; the resistors are removed by opening grounding switches 93; and full excitation of the alternator field is reestablished. Since engine torque is then attempting to drive the propeller in reverse, fuel is added at the maximum rate permissible, without exceeding the maximum tolerable negative torque, until the ship has stopped with the fuel flow reduced and the alternator excitation reduced to zero.

Figure 2A:
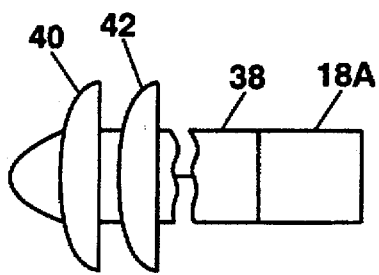
FIGS. 2A, 2B and 2C are simplified side view illustrations of three alternative embodiments of the motorized propulsors associated with the system depicted in FIG. 1.
Figure 2B:
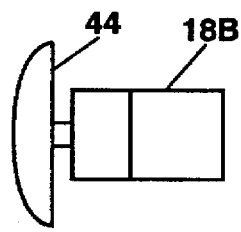
Figure 2C:
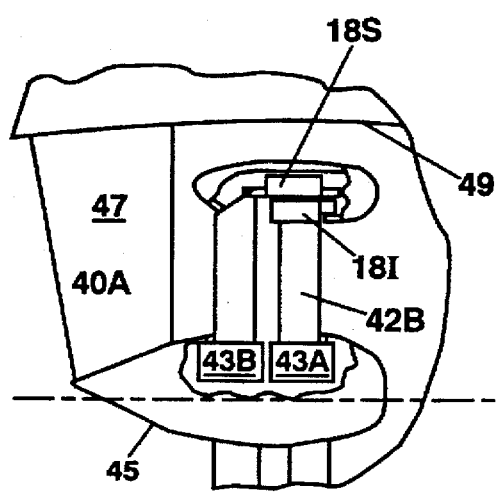

In regard to the propulsion motors 18 diagrammed in FIG. 1, a high-speed type of induction motor 18a is drivingly connected through epicyclic gearing 38 to contrarotating propulsion propellers 40 and 42 as shown in FIG. 2A. FIG. 2B on the other hand diagrams a low-speed type of induction motor 18b as an alternative, directly driving a single propulsion propeller 44. FIG. 2C diagrams contrarotating motors 18s and 18i mounted radially outwardly on the tips of contrarotating aft and forward propellers 40a and 42b. Propulsion control inputs to such motors are supplied through toroidal rotating field transformers 43a and 43b mounted on the propellers radially inwardly thereof within a thrust block housing 45 fixed by a strut 47 to the hull 49 of the ship being propelled.

Based on the foregoing description, the system 10 enables a single engine to efficiently provide all propulsion and service power under normal operating conditions. In case of any operational failure, another engine can be rapidly brought on line while vital load functions and engine-starting are performed under battery power.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a sea-going vessel having propulsion motors, fuel operated engines and electrically powered equipment, a system supplying electrical energy to said motors for propulsion of the vessel and to the electrically powered equipment for operation thereof including: a battery source of power, a pair of alternators adapted to be driven by one of said fuel operated engines; service control means operatively connected to the electrically powered equipment for alternatively supplying the electrical energy thereto from the battery source of power or charging the battery source of power with the electrical energy from one of said pair of the alternators; and propulsion control means operatively connecting the other of said pair of the alternators to the propulsion motors for selectively supplying the electrical energy to one of the propulsion motors from said other of the alternators.

2. The combination as defined in claim 1 wherein said electrically powered equipment includes electrically operated weapons and weapon control means in the system operatively connected to said other of the alternators for selectively supplying the electrical energy to the weapons.

3. The system as defined in claim 2 wherein each of said alternators includes polyphase stator windings connected to the service control means and the weapons control means.

4. The system as defined in claim 3 wherein each of the service control means and the weapons control means includes rectifier means for converting ac current from the alternators into dc current as the electrical energy supplied to the electrically powered equipment.

5. The system as defined in claim 4 wherein said other of the alternators includes polyphase rotor windings connected to the propulsion control means.

6. The systems as defined in claim 5 wherein the propulsion motors are of the polyphase induction type having multiple pairs of stator windings and pole selection switch means connecting said pairs of stator windings to the propulsion control means.

7. The system as defined in claim 1 wherein said other of the alternators includes polyphase rotor windings connected to the propulsion control means.

8. The system as defined in claim 1 wherein the propulsion motors are of the polyphase induction type having multiple pairs of stator windings and pole selection switch means connecting said pairs of stator windings to the propulsion control means.

9. The system as defined in claim 1 wherein the service control means includes rectifier means for converting ac current from said one of the alternators into dc current as the electrical energy supplied to the electrical powered equipment.

10. The system as defined in claim 1, wherein the propulsion control means includes rotatable phase transformers respectively connecting the propulsion motors to the alternators.

* * * * *